US008607270B2

(12) United States Patent
Chen (10) Patent No.: US 8,607,270 B2
(45) Date of Patent: Dec. 10, 2013

(54) VIRTUAL TUNER

(75) Inventor: Jun Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1272 days.

(21) Appl. No.: 10/772,130

(22) Filed: Feb. 3, 2004

(65) Prior Publication Data

US 2005/0172315 A1    Aug. 4, 2005

(51) Int. Cl.
*G06F 3/00* (2006.01)
(52) U.S. Cl.
USPC .............................. 725/39; 725/38
(58) Field of Classification Search
USPC .................... 725/39, 40, 43, 44, 59
See application file for complete search history.

(56) References Cited

U.S. PATENT DOCUMENTS

| | | | | |
|---|---|---|---|---|
| 6,047,312 A * | 4/2000 | Brooks et al. | ........... | 709/203 |
| 6,144,376 A * | 11/2000 | Connelly | ........... | 725/44 |
| 6,305,020 B1 * | 10/2001 | Hoarty et al. | ........... | 725/95 |
| 6,442,755 B1 * | 8/2002 | Lemmons et al. | ........... | 725/47 |
| 6,526,577 B1 * | 2/2003 | Knudson et al. | ........... | 725/40 |
| 6,738,982 B1 * | 5/2004 | Jerding | ........... | 725/112 |
| 6,792,616 B1 * | 9/2004 | Jerding et al. | ........... | 725/38 |
| 6,883,176 B1 * | 4/2005 | Grooters | ........... | 725/39 |
| 7,152,236 B1 * | 12/2006 | Wugofski et al. | ........... | 725/40 |
| 7,254,823 B2 * | 8/2007 | Knudson | ........... | 725/46 |
| 2002/0049974 A1 * | 4/2002 | Shnier | ........... | 725/47 |
| 2002/0053075 A1 * | 5/2002 | Paz et al. | ........... | 725/10 |
| 2002/0133822 A1 * | 9/2002 | Yang et al. | ........... | 725/49 |
| 2003/0093795 A1 * | 5/2003 | Takahashi et al. | ........... | 725/49 |
| 2004/0025179 A1 * | 2/2004 | Russ et al. | ........... | 725/46 |
| 2004/0068752 A1 * | 4/2004 | Parker | ........... | 725/120 |
| 2004/0114036 A1 * | 6/2004 | Karaoguz et al. | ........... | 348/142 |
| 2004/0117826 A1 * | 6/2004 | Karaoguz et al. | ........... | 725/40 |
| 2004/0117835 A1 * | 6/2004 | Lorkovic | ........... | 725/81 |
| 2004/0139464 A1 * | 7/2004 | Ellis et al. | ........... | 725/43 |
| 2005/0021609 A1 * | 1/2005 | Houghton et al. | ........... | 709/203 |
| 2005/0028200 A1 * | 2/2005 | Sardera | ........... | 725/42 |
| 2006/0117348 A1 * | 6/2006 | D'Souza et al. | ........... | 725/40 |
| 2007/0033615 A1 * | 2/2007 | Hassell et al. | ........... | 725/46 |

* cited by examiner

*Primary Examiner* — Jason K Lin
(74) *Attorney, Agent, or Firm* — Lee & Hayes, PLLC (57) ABSTRACT

A virtual tuner is described. In an implementation, a method includes outputting an Electronic Programming Guide (EPG) for display by a client. The EPG includes a plurality of representations of a plurality of content. At least one of the content is television programming for receipt by the client over an Internet. The client includes a plurality of applications. One or more of the content is provided for output by a respective one of the applications. The EPG is configured to form one or more events in response to user interaction with one or more said representations. A virtual tuner is executed on the client to manage execution of each of the applications to provide respective content in response to the events formed utilizing the EPG.

34 Claims, 8 Drawing Sheets

VIRTUAL TUNER

TECHNICAL FIELD

The present invention generally relates to the field of television and more particularly relates to a virtual tuner.

BACKGROUND

Users of clients that are configured to access television programming, such a set-top boxes, computers, and so on, are continually exposed to an ever increasing variety of content. A user of a set-top box, for instance, may view traditional television programming obtained from a network for display on a television, as well as pay-per-view movies, video-on-demand (VOD), interactive video games, and so on.

To address the variety of content, the capabilities of clients utilized to output the content continue to change. For example, a user may utilize a client that is capable of receiving email, playing digital audio files, displaying traditional television programming, and so forth. Content providers which provide this variety of content, however, may utilize different formats, encryption algorithms, and so on, such that the content is specific to each content provider. Thus, a user that wishes to access the different types of content may need to utilize applications that are specially configured to access the content types provided by each content provider. When utilizing the various applications, however, the user may wish to switch between types of content. Therefore, the user may be forced to switch between executions of various applications, which may provide a disjointed viewing experience when accessing the variety of content. For example, a user switching between content that is provided by difference respective applications may be forced to manually switch between the applications to output the content.

Therefore, there is a continuing need to improve techniques for providing and accessing a variety of content.

SUMMARY

A virtual tuner is described. The virtual tuner may be utilized to unify execution of a variety of applications to provide content on a client. For example, the virtual tuner may be utilized in conjunction with an electronic program guide (EPG) to select content for rendering through execution of one or more of a plurality of applications, such as web browsers, game applications, applications that are utilized to output traditional television programming, and so on. The virtual tuner, when executed, may be utilized to manage the lifecycle of each of the applications to provide the selected content, such as to launch and terminate the applications, manage windows where the content is to be rendered, and so forth.

In an implementation, a method includes outputting an Electronic Programming Guide (EPG) for display by a client. The EPG includes a plurality of representations of a plurality of content. At least one of the content is television programming for receipt by the client over an Internet. The client includes a plurality of applications. One or more of the content is provided for output by a respective one of the applications. The EPG is configured to form one or more events in response to user interaction with one or more said representations. A virtual tuner is executed on the client to manage execution of each of the applications to provide respective content in response to the events formed utilizing the EPG.

In an additional implementation, in a virtual tuner executed on a client, a method includes receiving a selection made from a plurality of content using an EPG that is output by the client. The EPG includes a representation of each of the content. Each of the content is provided for output by a respective one or more of a plurality of applications. The content includes television programming. One or more of the plurality of applications are chosen that, when executed, provide the selected content. Execution of the chosen one or more applications is managed to output the selected content.

BRIEF DESCRIPTION OF THE DRAWINGS

FIG. 8 is an illustration of an exemplary operating environment. The same reference numbers are utilized in instances in the discussion to reference like structures and components.

DETAILED DESCRIPTION

Overview

A virtual tuner is described. The virtual tuner may be utilized to unify execution of a variety of applications to provide content on a client. For example, the virtual tuner may be utilized in conjunction with an Electronic Program Guide (EPG) to select content for rendering through execution of one or more of a plurality of applications, such as web browsers, game applications, applications that are utilized to output traditional television programming, and so on. The virtual tuner, when executed, may be utilized to manage the lifecycle of each of the applications to provide the selected content, such as to launch and terminate the applications, manage windows where the content is to be rendered, and so forth.

Figure 1:
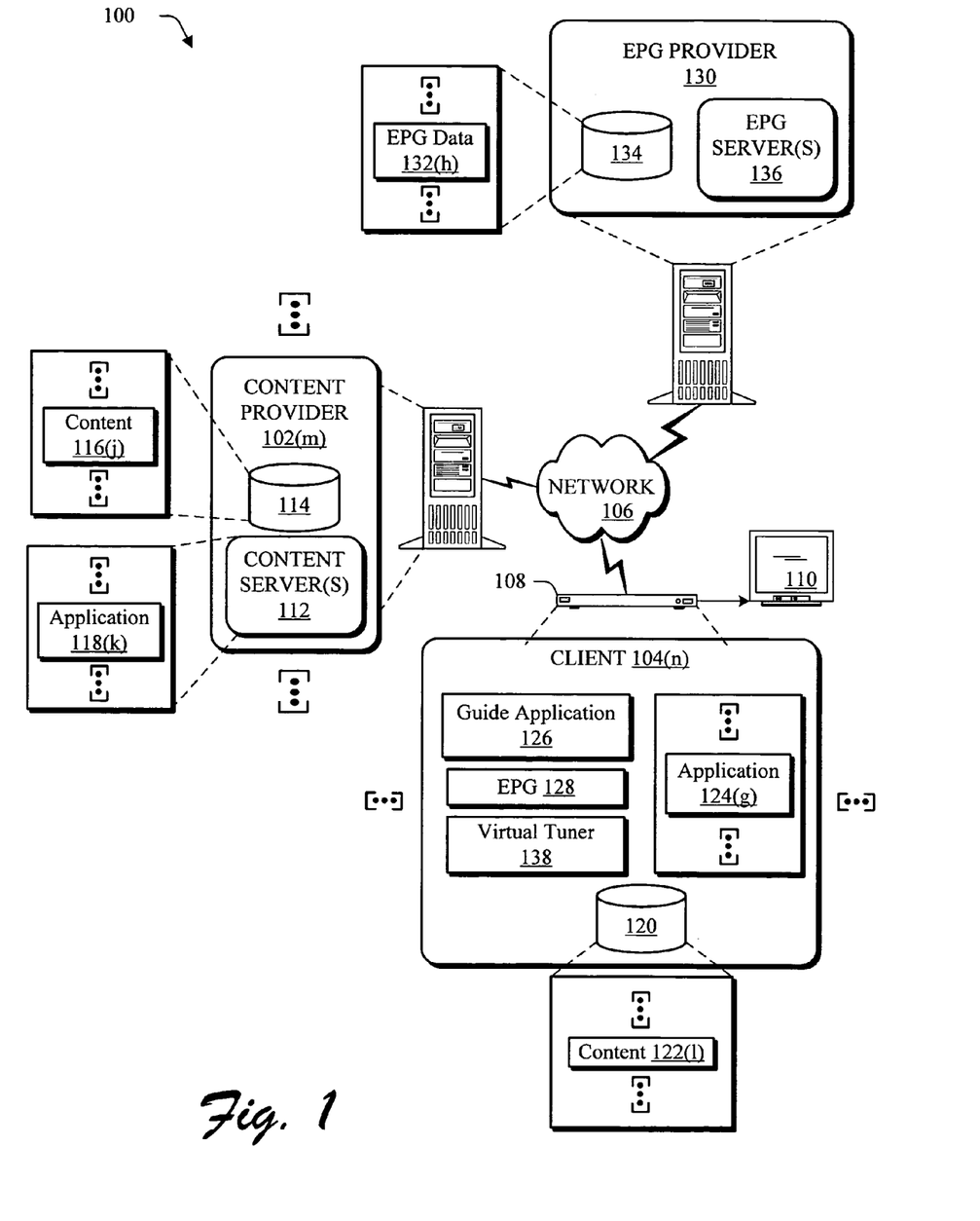
FIG. 1 is an illustration of an exemplary implementation showing an environment in which content is communicated from a plurality of content providers and from an EPG provider to a plurality of clients over a network.

The EPG, for instance, may include a plurality of representations of content that are available for output on the client. The representations may include content that is available locally and remotely for output on the client. For example, the representations may include content that is available remotely over a network (e.g., traditional television programming, video-on-demand content, pay-per-view movies, remote application processing, remote video games, and so on,) as well as local content that is provided on the client without use of a network connection (e.g., previously-stored television programming, local video games, and so on). The virtual tuner, when executed, may manage applications that are utilized to provide the local and remote content. Therefore, a user may select one or more items of content through interaction with the EPG Exemplary Environment FIG. 1 is an illustration of an exemplary implementation showing an environment 100 in which content is communicated from a plurality of content providers 102(m) to a plurality of clients 104(n) over a network 106, where "m" can be any integer from one to "M" and "n" can be any integer from one to "N". The client 104(n) may be configured in a variety of ways. For example, the client 104(n) may be configured as a computer that is capable of communicating over the network 106, such as a desktop computer, a mobile station, an entertainment appliance, a set-top box 108 communicatively coupled to a display device 110 as illustrated, a wireless phone, and so forth. The client 104(n) may range from a full resource device with substantial memory and processor resources (e.g., television enabled personal computers, television recorders equipped with hard disk) to a low-resource device with limited memory and/or processing resources (e.g., traditional set-top boxes). The client 104(n) may also relate to a person and/or entity that operate the client. In other words, client 104(n) may describe a logical client that includes a user and/or a machine.

The network 106 is illustrated as a wide area network (WAN). For example, the network 106 may also include a variety of networks that provide two-way communication, such as the Internet, an intranet, a wired or wireless telephone network, and so forth. The network 106 may also include a broadcast network that includes back channel communication such that the client 104(n) may communicate with the plurality of content providers 102(m), which is described in greater detail in relation to FIG. 2. In another implementation, the network 106 is a broadcast network that does not support two-way communication.

The content provider 102(m) includes a content server 112 and a database 114 of stored content 116(j), where "j" can be any integer from one to "J". The stored content 116(j) may include a variety of content, such as television programming, video-on-demand (VOD), one or more results of remote application processing, and so on. For example, the content server 112 may include a plurality of applications 118(k), where "k" can be any integer from one to "K", that are executed to provide the content 116(j). Although the content 116(j) is illustrated as stored in the database 114, the content 116(j) may be provided directly through execution of one or more of the plurality of applications 118(k) without storing the content 116(j) locally on the content provider 102(m).

The content server 112 provides the content 116(j) from the database 114 and/or through execution of the plurality of applications 118(k) over the network 106 to the client 104(n). The content 116(j) may then be output directly by the client 104(n) and/or stored for later output by the client in a database 120 as content 122(l), where "l" can be any integer from one to "L". Distribution from the content provider 102(m) to the client 104(n) may be accommodated in a number of ways, including cable, RF, microwave, digital subscriber line (DSL), and satellite.

The client 104(n) may be configured in a variety of ways to receive the content 116(j) from over the network 106. For example, the client 104(n) may be configured as a set-top box 108, as illustrated, that is communicatively coupled to a display device 110. Although the display device 110 is illustrated separately from the set-top box 108, the client 104(n) may also include an integrated display device. The client 104(n) includes hardware and software to transport and decrypt content 116(j)) received from the plurality of content provider 102(m) and/or content 122(l) stored locally in the database 120 for rendering by the display device 110. For example, the client 104(n) may include digital video recorder (DVR) functionality. The database 120, for instance, may be implemented on a storage device to store content 122(l) for output to and rendering by the display device 110. Thus, content 122(l) may include copies of content 116(j) that was received over the network 106 from the content provider 102(n).

Additionally, content 122(l) may be obtained from a variety of local sources, such as from a computer-readable medium that is accessed by the client 104(n), content that was captured by the client 104(n), and so on. For example, the client 104(n) may execute one or more of a plurality of applications 124(g), where "g" can be any integer from one to "G", that provide content. Application 124(g), for instance, may be configured as a video editing program, game application, and so on that provides content for output by the client 104(n). Further discussion of local provision of content through execution of one or more of the plurality of applications 124(g) may be found in relation to FIG. 3.

The client 104(n) also includes a guide application 126 that, when executed, may generate and manage an Electronic Program Guide (EPG) 128. For instance, the guide application 126, when executed, may receive one or more communications from an EPG provider 130 over the network 106. The communications include EPG data 132(h), where "h" can be any integer from one of "H". The EPG data 132(h) may be stored in a database 134 for communication over the network 106 by an EPG server 136. Although a single EPG server 136 is shown, a plurality of EPG servers may be utilized to provide EPG data 132(h). Further discussion of the EPG provider 130, EPG data 132(h), and EPG server 136 may be found in relation to FIG. 2. Although the EPG provider 130 is illustrated as separate from the content providers 102(m), the EPG provider 130 may also provide content.

The EPG 128, when executed on the client 104(n), provides an interface for display on the display device 110 for interaction by a user. The EPG 128, for instance, may be utilized by the user to navigate through content 116(j) that is provided remotely over the network 106 and content 122(l) that is available locally on the client 104(n). A virtual tuner 138 is executed on the client 104(n) to manage execution of one or more of the plurality of applications 124(g) that are utilized to provide the content. For example, the virtual tuner 138 may receive an event initiated by the EPG 128 to output a particular item of content. The virtual tuner 128, when executed, may locate one of the plurality of applications 124(g) that are utilized to output the particular item of content, launch the application 124(g), control placement and arrangement of windows on the display device 110 utilized to display the content, and terminate the application 124(g) when the display of the content 124(g) is completed. Further discussion of execution of the virtual tuner 138 may be found in relation to FIGS. 4 and 6.

Figure 2:
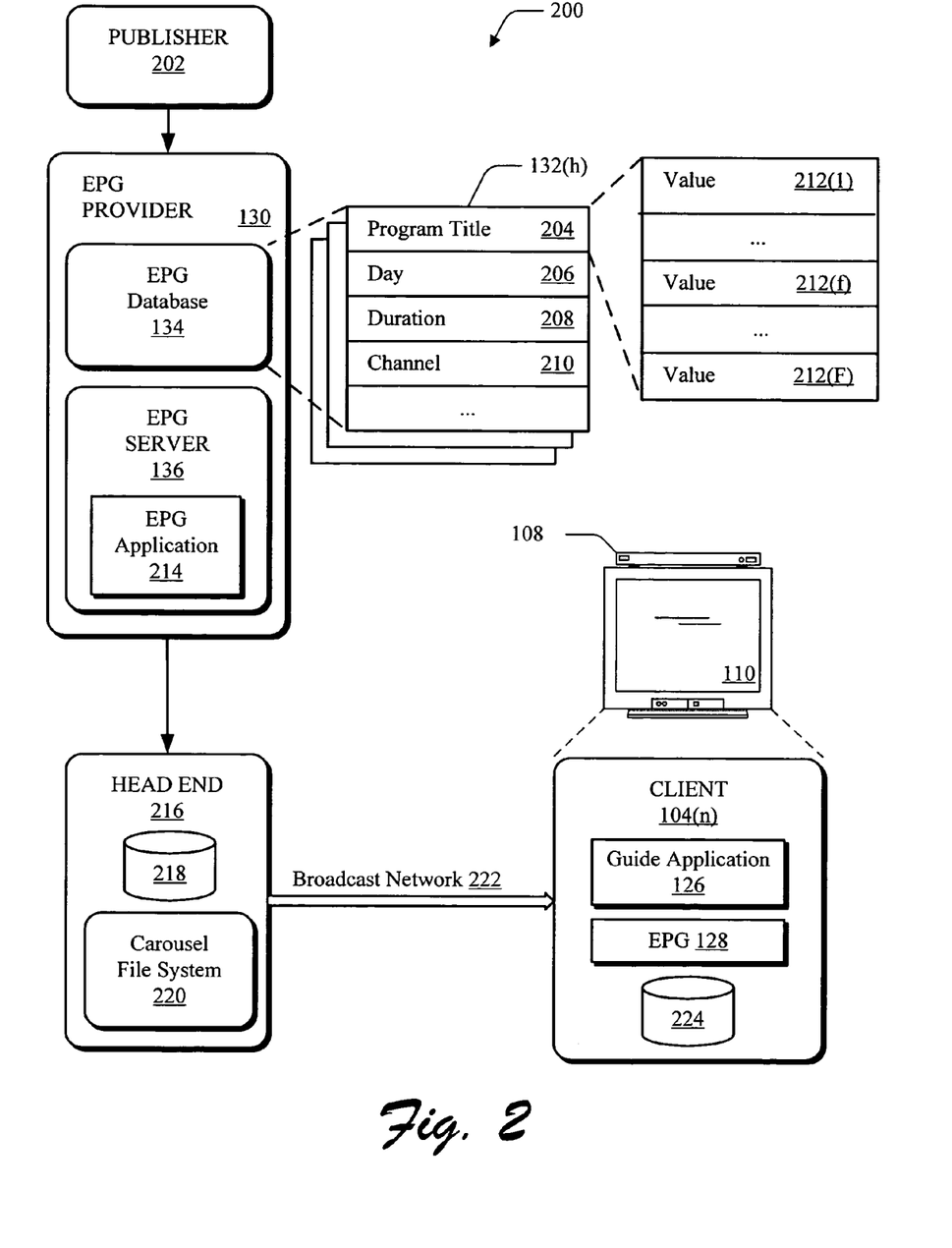
FIG. 2 is an illustration of a system in an exemplary implementation that provides EPG data which includes the EPG provider and the client of FIG. 1.

FIG. 2 is an illustration in an exemplary implementation of a system 200 that provides EPG data 132(h). The system 200 includes the EPG provider 130 and client 104(n) of FIG. 1. The system 200 also includes a publisher 202 that creates EPG data 132(h) for distribution to the client 104(n). One example of a publisher 202 is Tribune Media Services of Chicago, Ill., which generates EPG data for interactive television networks. As used herein, EPG data 132(h) refers to a type of data that might be used to construct the EPG 128. EPG data 132(h) may include data that describes characteristics of content 116(j) that is provided by the content provider 102(m) of FIG. 1. The characteristics may include program title 204, day 206 the content is provided, output duration 208 of the content, channel 210 that broadcasts the content, and other characteristics, such as rating, description, lead protagonist's name, year made, station call letters, time schedules, channel numbers, and so on. Each of the characteristics has one or more corresponding values 212(l), . . . , 212(f), . . . , 212(F), such as "Everybody Loves Raymond" for the characteristic "program title."

The EPG data 132(h) is transferred as an electronic file from the publisher 202 to the EPG provider 130. As one example, the EPG data 132(h) is transferred using a file transfer protocol (FTP) over a TCP/IP network (e.g., Internet, Intranet, etc.) to the EPG provider 130. The EPG data 106 may be stored in the EPG database 134 at the EPG provider 130 as previously described.

The EPG provider 130 may process the EPG data 132(h) before communication the EGP data 132(h) to the client 104(n). For example, the original version of the EPG data 132(h) may contain all of the programming information for multiple days. The EPG server 136 processes the EPG data 132(h) by executing an EPG application 114. The processing involves one or more techniques to condition the EPG data 132(h) so that the client device 104(n) may handle the EPG data 132(h) more effectively. For example, the client 104(n) may be configured as a low-resource client device that is typically characterized as having limited memory and/or processing resources. Such a client 104(n) may not be able to store the entire original version of the EPG data 132(h). With limited resources at the client device 104(n), the processes performed by executing the EPG application 214 by the EPG server 136 are helpful to precondition the EPG data 132(h) into a more suitable form for storage and processing on the client 104(n).

Among other processes, the EPG server 136, through execution of the EPG application 214, is configured to reduce the amount of EPG data 132(h) so that it can be stored at the client 104(n) even if the client 104(n) has limited resources. For example, the EPG server 136 may compress the EPG data 132(h) prior to its distribution by using the EPG application 214. The EPG application 214 may be implemented as software that is used to compress the EPG data 132(h) for communication to the client 104(n).

The EPG server 136 provides the EPG data 132(h) in a compressed format to a head end 216 for storage in a database 218. A carousel file system 220 repeatedly broadcasts the EPG data 132(h) over an out-of-band (OOB) channel to the client 104(n) over a broadcast network 222 for storage in a database 224 on the client 104(n). Thus, the system 200 of FIG. 2 is illustrated as including a wide area network (WAN) that is configured as a traditional broadcast network 222 which may also be utilized to broadcast content 116(j) from the content provider 102(m) of FIG. 1. Distribution from the head end 216 to the client 104(n) may be accommodated in a number of ways, including cable, RF, microwave, and satellite. Although the head end 216 is illustrated as separate from the EPG provider 130, the EPG provider 130 may also include the head end 216 and the EPG server 136. Additionally, the EPG server 136 may be included as part of the publisher 202 that provides the EPG data 132(h).

The client 104(n) is often equipped with sufficient processing and storage capabilities to store and run an operating system and the plurality of applications 124(g) of FIG. 1. Although the set-top box 108 is shown separately from the display device 110, they may alternatively be built into the display device 110 as integral units as previously described. Furthermore, in other implementations, the client 104(n) may be embodied as other devices capable of handling EPG data, such as a broadcast-enabled computer.

The client 104(n) executes the guide application 126 to construct the EPG 128 from the EPG data 132(h). In an implementation, the EPG data 132(h) includes data describing content 116(j) provided by the plurality of content providers 102(m) of FIG. 1. In an additional implementation, the EPG data 132(h) obtained from the EPG provider 130 also includes data that describes content 122(l) that is available locally on the client 104(n). For example, the EPG data 132 (h) may describe content that is available through execution of one or more of the applications 124(g) of FIG. 1, content 122(l) that is stored in the database 120 on the client 104(n), and so forth. The EPG data 132(h), for instance, may describe one or more television programs that were recorded in the database 120 by the client 104(n), one or more applications 124(g) that were provided by the content provider 102(m) that, when executed, provide content, and so on. Thus, the EPG data 132(h) is not limited to description of television programming, but may also encompass other types of content.

Figure 3:
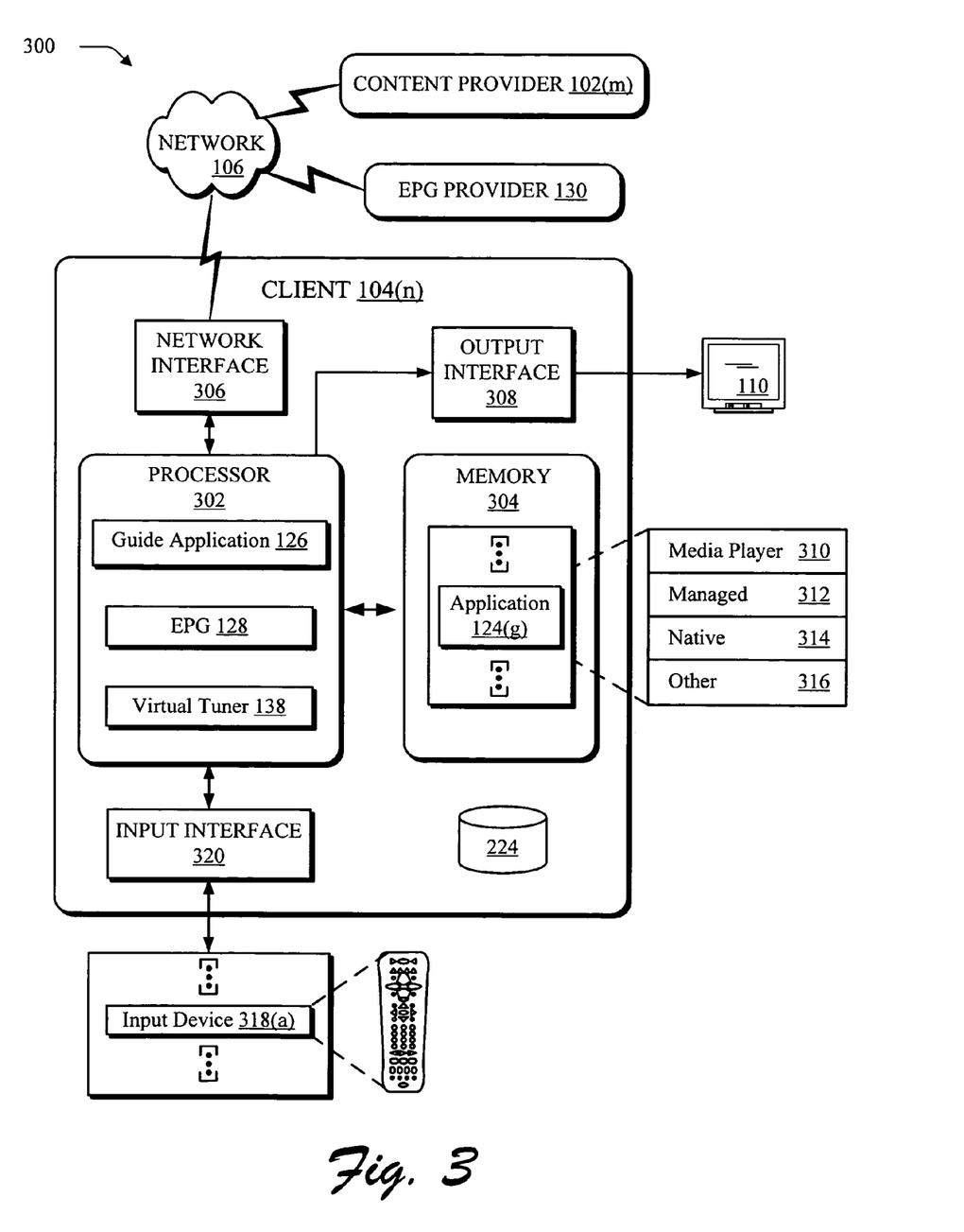
FIG. 3 is an illustration in an exemplary implementation of a system that includes the content provider and the EPG provider of FIG. 1 and shows the client of FIG. 1 in greater detail.

FIG. 3 is an illustration in an exemplary implementation of a system 300 that includes the content provider 102(l) and EPG provider 130 of FIG. 1 and shows the client 104(n) of FIG. 1 in greater detail. The client 104(n) includes a processor 302 and memory 304. The guide application 126, the EPG 128, and the virtual tuner 138 are illustrated as being executed on the processor 302 and are storable in memory 304. The plurality of applications 124(g) are illustrated as stored in memory 304 and are executable on the processor 302. The database 224, which is used for local storage of the EPG data 132(h) on the client 104(n), is illustrated as separate from memory 304. The database 224, however, may also be implemented as part of memory 304. For example, the memory 304 may be configured as RAM and the database 224 may be implemented as a hard disk drive, the database 224 may be stored in memory 304, the database 224 may be provided in removable memory, and so forth.

The client 104(n) includes a network interface 306 to communicatively couple the client 104(n) with the network 106. In the system 300 of FIG. 3, the network 106 is illustrated as the Internet, but may also include other WANs as described in relation to FIG. 1, the broadcast network 222 of FIG. 2, and so on. For instance, the network interface 306 may be configured as one or more tuners to receive a broadcast of the EPG data 132(h) using the carousel file system 220 of FIG. 2. In the illustrated implementation of FIG. 3, the network interface 306 may be configured to provide two-way communication over the Internet to communicatively couple the client 104(n) with the EPG provider 130 and/or the plurality of content providers 102(m). Thus, the client 104(n) may obtain EPG data 132(h) of FIG. 1 from over the network 106, execute the guide application 126 on the processor 302 to generate the EPG 128, and output the EPG 128 using the output interface 308 for rendering by the display device 110.

To provide content for output, the client 104(n) may execute one or more of the plurality of applications 124(g). The plurality of applications 124(g) may be configured in a variety of ways to provide content output. For example, each application 124(g) may be configured for output of a particular type of content, such as content having a particular format, content employing unique encryption techniques, and/or particular kinds of content, e.g. audio, video, multimedia, and so forth. Additionally, one or more of the plurality of applications 124(g) may be configured to output content that is not suitable for processing by another one of the plurality of applications 124(g). In other words, content types supported by the applications in some instances may not be compatible with each other.

To manage the plurality of applications such that one or more of the applications 124(g) are launched that correspond to a type of a desired item of content, the client 104(n) executes the virtual tuner 138. The virtual tuner 138, when executed on the processor 302, may be utilized to hide the particulars of how a desired item of content is provided for output on the client 104(n). For example, a user may utilize one or more of a plurality of input devices 318(a), where "a" can be any integer from one to "A", to select content through interaction with the EPG 128. The selection is made through local communication of the input device 318(a) with the input interface 320, such as a Universal Serial Bus (USB) connection, a radio-frequency (RF) connection, and so forth. The selection is received by the EPG 128, which passes the selection to the virtual tuner 138. The virtual tuner 138, when executed, controls the lifecycle of one or more of the plurality of applications 124(g) to provide the selected content for output on the output interface 308. Thus, the virtual tuner 138 may be utilized to automate output of the content on the client 104(n) such that a user of the client 104(n) does not need to manually switch between the applications 124(g) to output desired content, which is described in greater detail in the following implementation.

Figure 4:
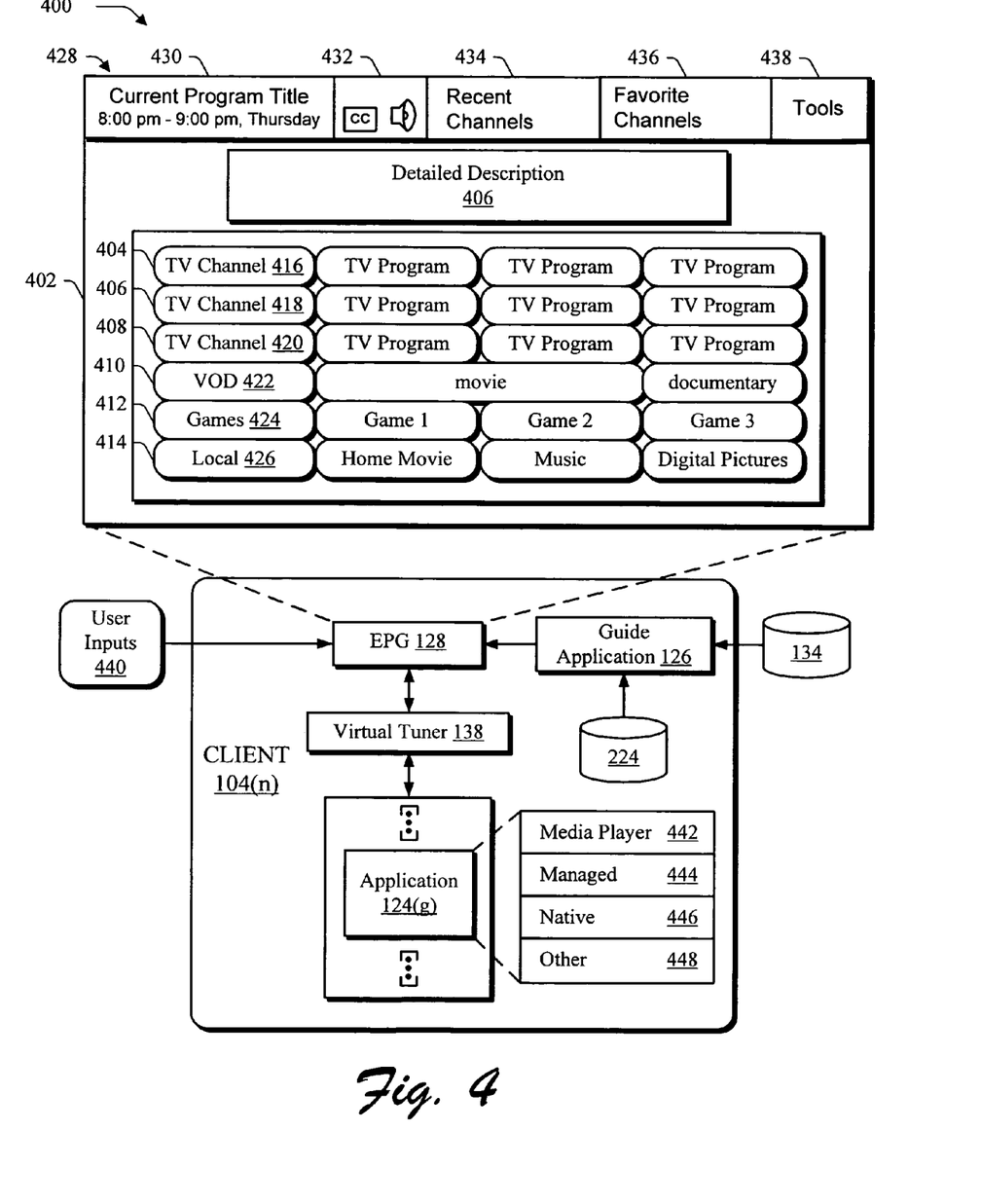
FIG. 4 is an illustration of an exemplary implementation of a system having an exemplary display of an EPG of FIG. 1 which includes a plurality of representations of content for selection by a user.

FIG. 4 is an illustration of an exemplary implementation of a system 400 having an exemplary display 402 of the EPG 128 of FIG. 1. The display 402 includes a plurality of representations of content for selection by a user. The display 402 is organized as a plurality of "channels" 404-414. Channels 404-408 represent traditional television broadcast channels, which are depicted as TV channels 416 through 420. Each of the TV channels 416-420 includes a plurality of representations of television programs, which are each illustrated respectively in FIG. 4 as "TV Program".

Channels 410-414 represent non-traditional television content, such as VOD 422, games 424, and local 426 content. VOD 422, as previously described, may include content that may be ordered by the client for output when desired, such as movies and documentaries. Games 424 includes representation of a plurality of games that are available for output on the client 104(n), such as through remote execution of one or more applications 118(k) on the content server 112 of FIG. 1 and/or local execution of one or more of the applications 124(g) on the client 104(n) itself. Channel 414 specifies local 426 content for output on the client 104(n), such as home movies, music, and digital pictures that are stored locally on the client 104(n). In this way, the EPG 128 provides a plurality of representations of content that include both television programming and other types of content that are available for output on the client 104(n).

As previously described, the guide application 126 may be executed on the client 104(n) to generate the EPG 128 from EPG data that is obtained from the database 134 of the EPG provider 130 and/or the database 224 that is available locally on the client 104(n). The guide application 126 may also include a variety of other functionality in the EPG 128. For example, the display 402 of the EPG 128 is illustrated as including a menu bar 428 to enable a user to navigate between functionality utilizing one or more of the input devices 318(a) of FIG. 4. The illustrated menu bar 428 has functionality including current program title 430, audio functionality 432 such as closed captioning and stereo, recent channels 434, favorite channels 436, and tools 438, such as options for arrangement, font selection, and so on.

The EPG 128, when generated, provides a user interface (UI) that is configured to receive user inputs 440. For instance, a user may utilize the input device 318(a) of FIG. 3, which is illustrated as a television remote control, to select one or more of the representations of the display 402 of the EPG 128. The selections are managed by the virtual tuner 138 to select a corresponding one or more of the applications 124(g) for execution. The applications 124(g) may include a variety of application types, such as a media player 442, managed 444 applications 444, native applications 446, and other applications 448. Thus, the virtual tuner 138 allows different types of content to be output for rendering through user inputs 428 that are provided when interacting with the EPG 128, further discussion of which may be found in relation to FIGS. 6 and 7.

Exemplary Procedures

Figure 5:
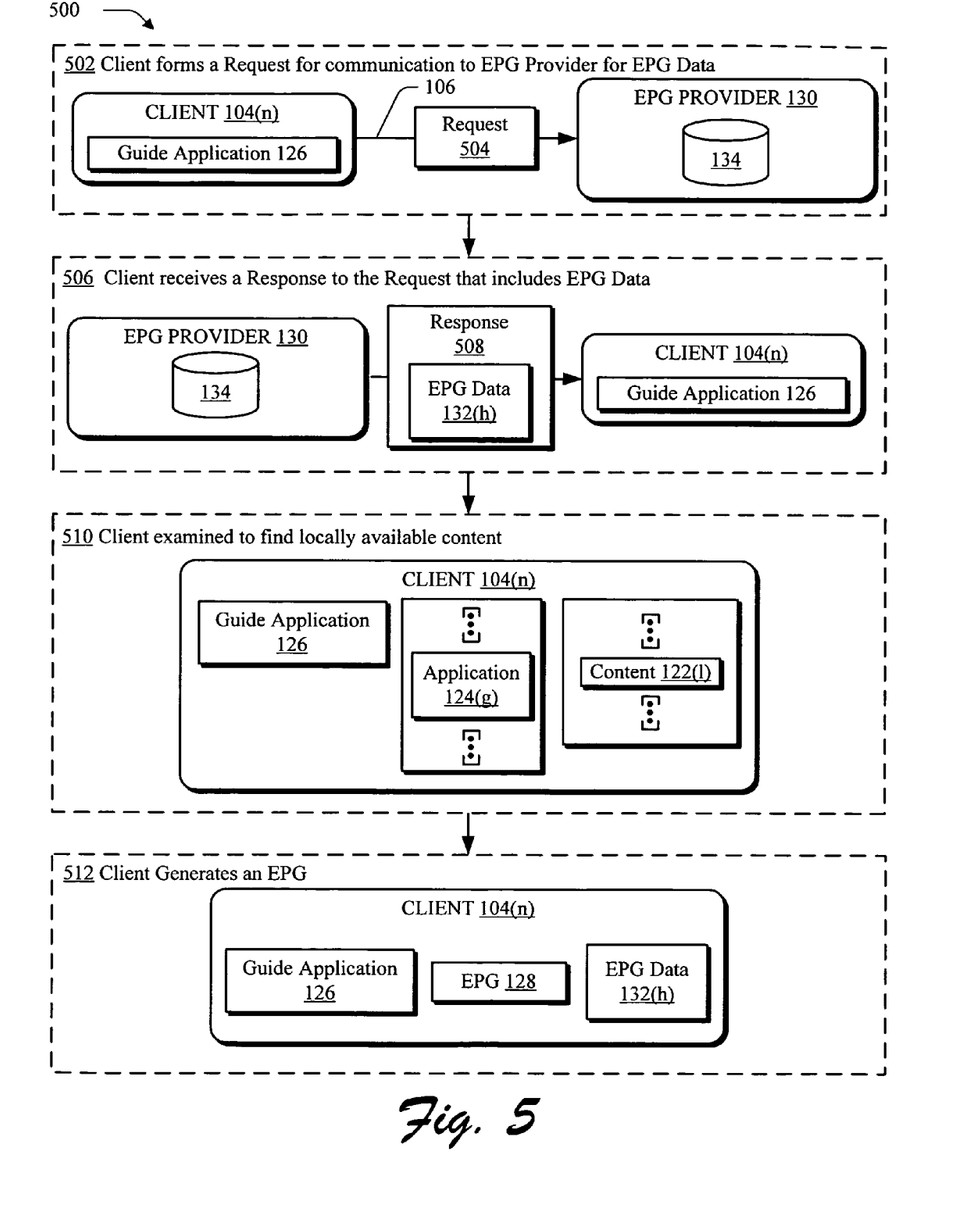
FIG. 5 is a flow chart depicting a procedure in an exemplary implementation in which the EPG of FIG. 1 is generated from EPG data received from the EPG provider and from an examination of client.

FIG. 5 is a flow chart depicting a procedure 500 in an exemplary implementation in which the EPG 128 of FIG. 1 is generated from EPG data 132(h) received from the EPG provider 130 and from an examination of client 104(n). At block 502, the client 104(n) forms a request 504 for EPG data for communication to the EPG provider 130 over the network 106. The request 504 may be configured in a variety of ways. For example, the request 504 may specify a particular time interval. The EPG provider 130 may then provide EPG data that is specific to the particular time interval. Additionally, the request 504 may include a client identifier (ID). The client ID may be utilized to identify each of the plurality of clients 104(n) of FIG. 1 such that the EPG provider 130 may identify access rights of the particular client. For example, each of the plurality of clients 104(n) of FIG. 1 may subscribe to different collections of content 116(j) that are available from the plurality of content providers 102(m). The client ID may be utilized by the EPG provider 130 to provide EPG data that is specific to each client 104(n) such that the EPG data may be tailored for each client 104(n), collections of clients (e.g., clients of a particular multiple systems operator (MSO)), and so on.

At block 506, the client 104(n) receives a response 508 to the request 504 that includes the EPG data 132(h). The EPG provider 130, for instance, may examine the database 134 utilized to store the EPG data 132(h) and retrieve EPG data corresponding to the request 504. The EPG data 132(h) may describe a variety of content. For example, the EPG data 132(h) may describe content 116(j) of FIG. 1 that is available from the plurality of content providers 102(m) remotely over the network 106. A variety of remote content 116(j) may be provided, such as VOD, PPV, remote application processing, web browsing, email, network digital video recording (NDVR), and so on. The EPG data 132(h) may describe the remote content in a variety of ways, such as location of where to obtain the remote content, type of content (e.g., format of the content), kind of content (e.g., audio, video, multimedia), and other such descriptions.

At block 510, the client 104(n) is examined to find locally available content for output on the client 104(n) by executing the guide application 126. For example, the client 104(n) may include content 122(l) that was previously stored on the client 104(n) from a broadcast of content 116(j) of FIG. 1 from the content provider 102(m) over the network 106. Thus, even though the content 116(j) of FIG. 1 was previously provided over the network 106, the content 1160) is now locally stored on the client 104(n) as content 122(l) and thus is locally available. Additionally, the client 104(n) may include the plurality of applications 124(g) that, when executed, provide content for output on the client 104(n). Therefore, the guide application 126, when executed, may examine one or more of the plurality of applications 124(g) to determine content that is available for output through execution of the applications 124(g).

At block 512, the client 104(n) generates the EPG 128. In this exemplary procedure 500, the EPG 128 is generated through execution of the guide application 126 and based on the EPG data 132(h) received at block 506 and the examining performed at block 510. The EPG 128 includes a plurality of representations of content that is available for output on the client 104(n). The EPG 128, for instance, may include representations of remote content that are available to the client 104(n) as indicated by the EPG data 132(h) of block 506, such as traditional television programming, VOD, PPV, remote application processing, and so on. The EPG 128 may also include representations of local content, such as a video game that is read from a computer-readable medium and executed on the client 104(n), one or more locally-stored songs, and so forth. Thus, the EPG 128 generated at block 514 may provide a comprehensive listing of content that is available on the client 514. In an implementation, the EPG 128, when rendered, provides a display having representations that include both local and remote content. The display of the EPG 128, such as the display 402 of FIG. 4, may be navigated by a user using a television remote control over a local connection, such as the input device 318(a) illustrated in FIG. 3. In this way, the EPG 128 enables a user of the client 104(n) to navigate through different types of content and select content for output on the client 104(n), further discussion of which may be found in the following implementation.

Figure 6:
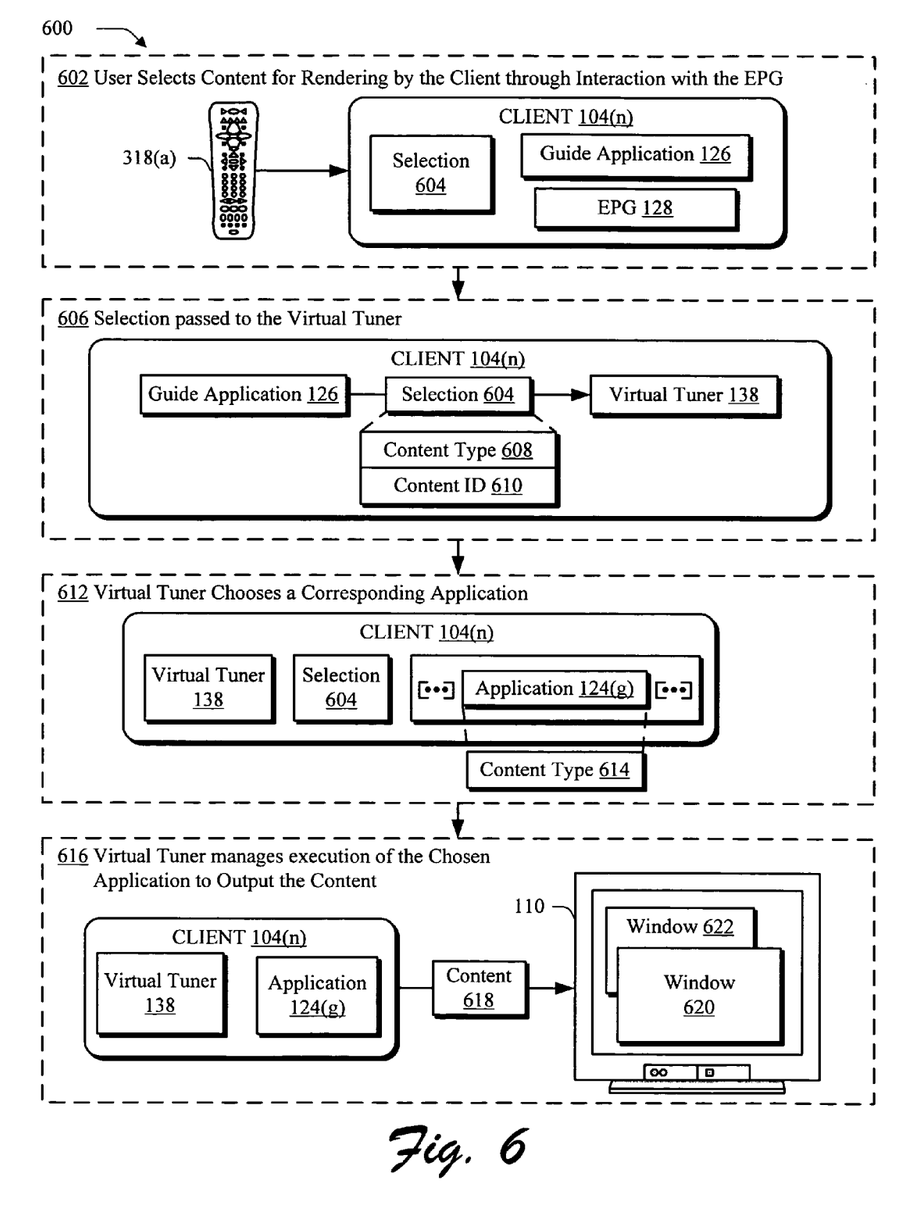
FIG. 6 is a flow chart depicting a procedure in an exemplary implementation in which the EPG generated in FIG. 5 is displayed such that a user may select content that is output on the client and managed by a virtual tuner.

FIG. 6 is a flow chart depicting a procedure 600 in an exemplary implementation in which the EPG 128 generated in FIG. 5 is displayed such that a user may select content for output on the client 104(n). The output of the content is managed by the virtual tuner 138. At block 602, a user selects content for rendering by the client 104(n) through interaction with the EPG 128. The EPG 128 may be output through execution of the guide application 126 on the client 104(n). For instance, the EPG 128, when output, may be rendered by the display device 110 such that the user may view the rendered EPG 128. The user utilizes an input device 218(a), illustrated as a television remote control in FIG. 6, to select one or more representations of content included in the rendered EPG 128. The guide application 126 may then form a selection 604 that identifies the content selected by the user through interaction with the EPG 128.

At block 606, the selection 604 is passed from the guide application 126 to the virtual tuner 138, which in this implementation are both executed on the client 104(n). The selection 604 provided by the guide application 126 specifies a content type 608 and content ID 610 of the selected content. The content type 608 may be utilized to indicate a type of application that is suitable for processing the content. For example, the content type 608 may include a uniform descriptor of the content, such as a file extension, that indicates how the content is encoded, encrypted, and so on. The content ID 610 may be utilized to identify the particular item of content, such as a television program title, a unique identifier, and so on.

At block 612, the virtual tuner 138 chooses a corresponding one of the plurality of applications 124(g) to output the content. For example, each of the plurality of applications 124(g) may have a content type 614 which identifies the type of content that may be processed by the applications 124(g). The virtual tuner 138, when executed on the client 104(n), may therefore choose one or more of the plurality of applications 124(g) which have a content type 614 that corresponds to the content type 608 of the selection 604.

At block 616, the virtual tuner 138 manages execution of the chosen application 124(g) to output the content 618. The virtual tuner 138, for instance, may launch the application 124(g) having a content type 614 that matches the content type 608 of the selection 604. The virtual tuner 138 may then pass the content ID 610 to the application 124(g) such that the application 124(g) may locate the content for output. In this implementation, the application 124(g) is an independent executable which acts as a content player to fetch the content 618, process the content 618, and output the processed content 618 for rendering by the display device 110. When output of the content 618 is completed, the virtual tuner 138 terminates execution of the application 124(g). In this way, the virtual tuner manages the lifecycle of the application 124(g) to output the content 618 automatically and without user intervention. Thus, the user of the client 104(n) need not even be aware that the application 124(g) was chosen and executed on the client 104(n) to output the selected content.

The virtual tuner 138 may also manage the application 124(g) during execution on the client 104(n). For example, the virtual tuner 138 may manage one or more windows 620, 622 that are displayed on the display device 110. Each of the windows 620, 622 may be utilized to display an output for the respective one or more of the plurality of applications 124(g) shown in block 612. In other words, each of the plurality of applications 124(g) may correspond with one of the windows 620, 622. The virtual tuner 138, when executed, manages the windows 620, 622 for each of the applications 124(g) such that content 618 is output as desired. For example, the virtual tuner 138 may cause window 620 to be displayed in the foreground on the display device 110 when the application 124(g) that corresponds to the window 620 provides content 618 for output. Window 622, which corresponds to an application that is not currently providing content for display on the display device 110, is displayed in the background on the display device 110. In other examples, the virtual tuner 138 may be utilized to show/hide the windows 620, 622, resize the windows 620, 622, arrange the windows 620, 622, and so on. Thus, the virtual tuner 138 may be utilized to choose the application 124(g) from a plurality of applications, launch the application 124(g) for execution on the client 104(n), control an output of content from the application 124(g), and terminate execution of the application 124(g) on the client 104(n). The virtual tuner 138, when executed, may also be controlled through one or more events communicated to the virtual tuner 138 from the EPG 128, which is described in greater detail in the following implementation.

Figure 7:
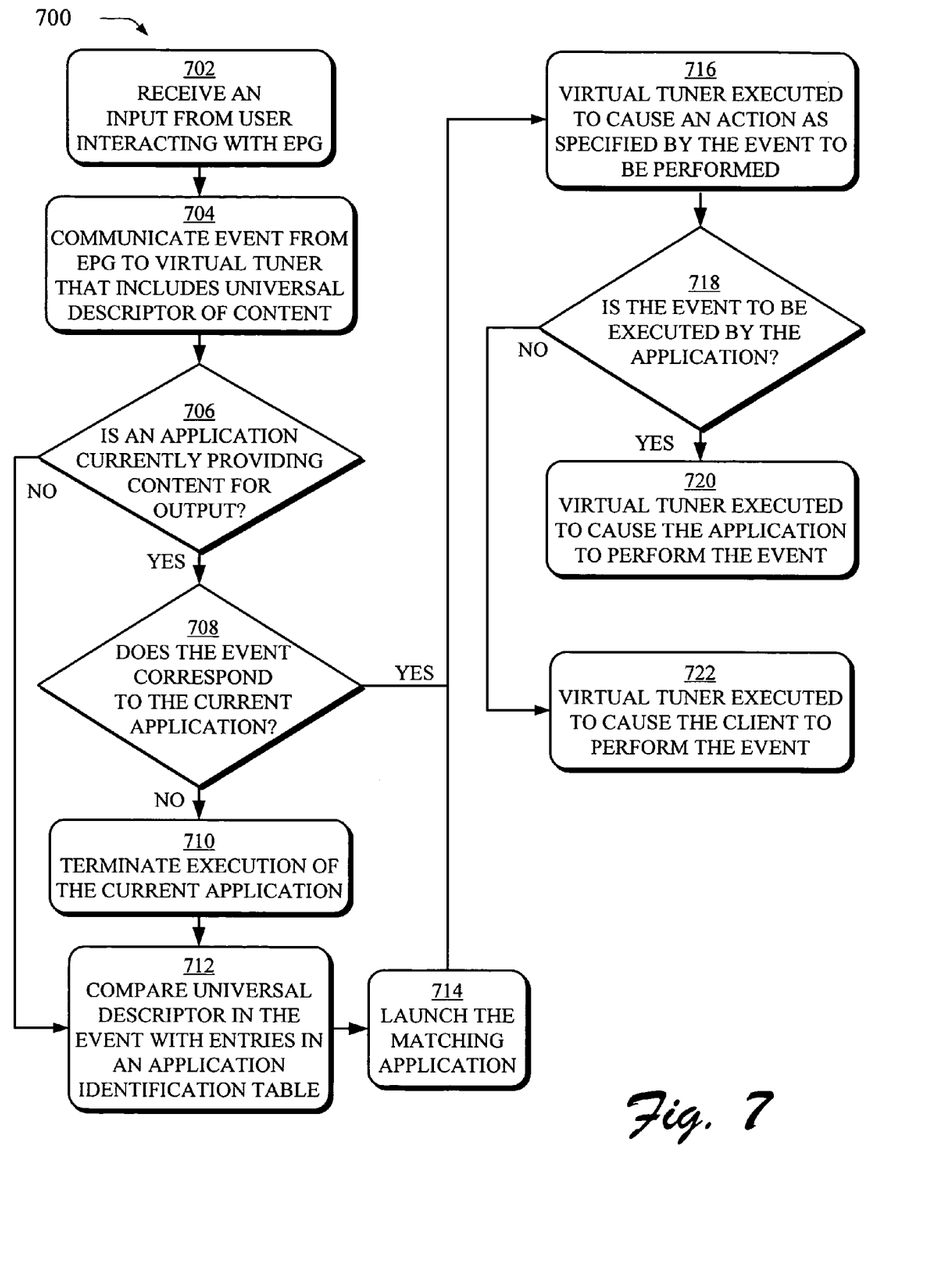
FIG. 7 is a flow chart depicting a procedure in an exemplary implementation in which events are communicated from the EPG to a virtual tuner of FIG. 1 to control output of content by the client.

FIG. 7 is a flow chart depicting a procedure 700 in an exemplary implementation in which event are communicated from the EPG 128 to the virtual tuner 138 of FIG. 1 to control output of content by the client 104(n). At block 702 an input is received from a user that is interacting with an EPG. At block 704, an event is communicated from the EPG to the virtual tuner that includes a universal descriptor of content. The event may be though of as an action or occurrence detected by an application. In this example, the event is a user action, such as pressing a button on a television remote control. Events can also be initiated by the client 104(n) itself, such as an indication that the display device 110 of FIG. 1 has been disconnected from the client 104(n). Thus, the EPG 128 and/or the virtual tuner 138 of FIG. 1 may be "event-driven" such that the EPG 128 and/or the virtual tuner 138 wait for events to occur.

At decision block 706, a determination is made as to whether an application is currently providing content for output. For example, the virtual tuner may examine applications that are currently executed on the client to determine whether one or more of the applications is providing content for output. If an application is currently providing content for output, then the procedure 700 proceeds to decision block 708.

At decision block 708, a determination is made as to whether the event corresponds to the current application that is providing output. The virtual tuner, for instance, may compare the universal descriptor of the content with an application identification table that is locally stored on the client. The application identification table is utilized to identify one or more applications with corresponding content. If the event does not correspond to the current application, execution of the current application is terminated by the virtual tuner and the procedure continues to block 712.

If an application is not currently providing content for output at block 706 or once execution of the current application is terminated at block 710, the universal descriptor in the event is compared with entries in the application identification table at block 712. Once a matching application is found, then the matching application is launched at block 714.

If the event does correspond to the current application at decision block 708 or once the matching application is launched at block 714, the procedure 700 continues at block 716. At block 716, the virtual tuner is executed to cause an action specified by the event to be performed. The virtual tuner may cause a variety of actions to be performed as specified by the event. For example, at decision block 718, a determination is made as to whether the event is to be executed by the application. The event, for instance, may specify slow-motion playback of the content and the application may be executed to provide the slow-motion playback. Therefore, at block 720, the virtual tuner is executed to cause the application to perform the event, such as by passing the event to the application for processing.

If at block 718, the event is not to be executed by the application, then at block 722, the virtual tuner is executed to cause the client to perform the event. For example, the client may include additional software and/or hardware functionality that may be initiated to control output of the content. The client, for instance, may include additional applications which process the content before it is output, may include hardware resource which process the content, and so on. Examples of such processing may include a switch from one display device to another, changing color of a display of rendered content, rearrangement of windows utilized to display the content, volume control, and so on. Thus, the virtual tuner may manage the output of the content both by interaction with the application that processes the content as well as additional software and/or hardware resources that are available on the client.

Exemplary Operating Environment

Figure 8:
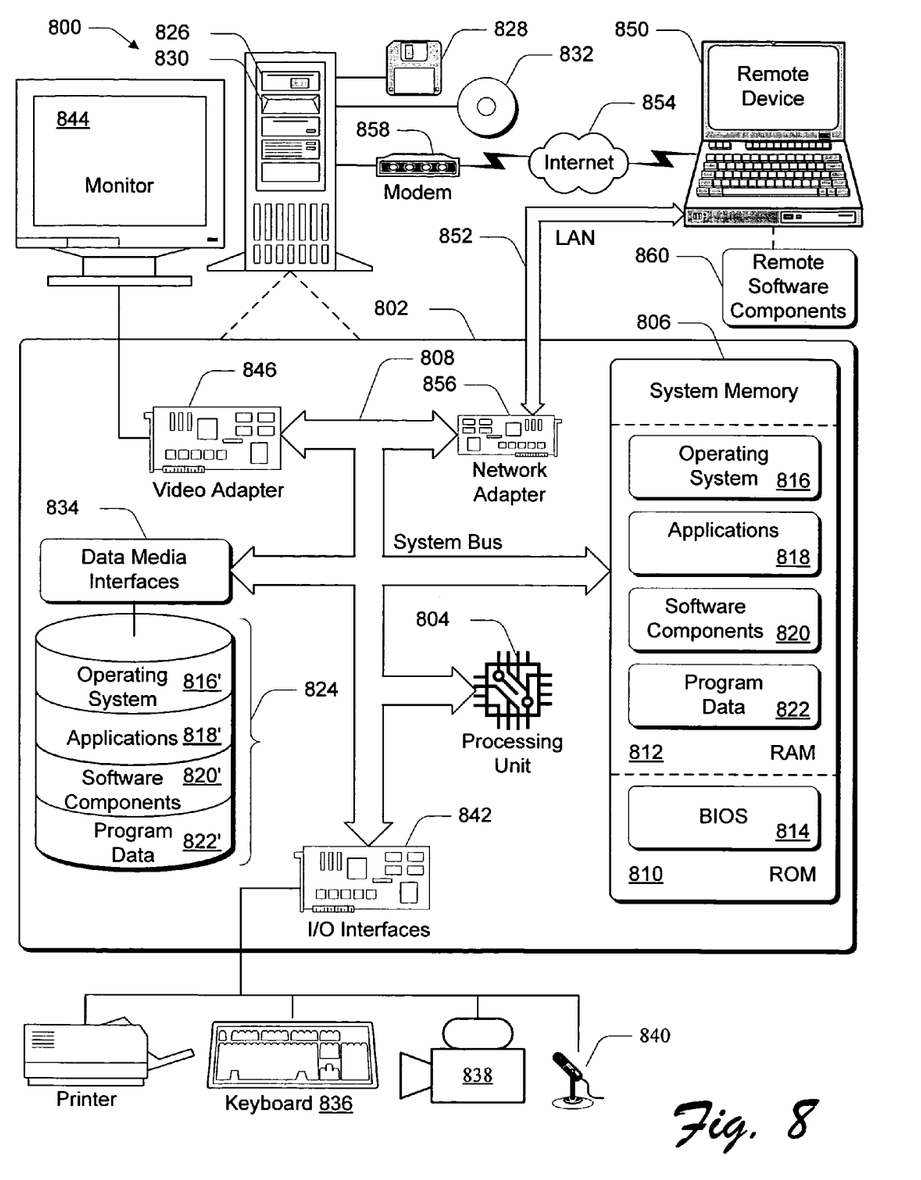

The various components and functionality described herein are implemented with a number of individual computers. FIG. 8 shows components of a typical example of a computer environment 800, including a computer, referred by to reference numeral 802. The computer 802 may be the same as or different from client 104(*n*) of FIG. 3. The components shown in FIG. 8 are only examples, and are not intended to suggest any limitation as to the scope of the functionality of the invention; the invention is not necessarily dependent on the features shown in FIG. 8.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, network-ready devices, minicomputers, mainframe computers, distributed computing environments that include any of the above systems or devices, and the like.

The functionality of the computers is embodied in many cases by computer-executable instructions, such as software components, that are executed by the computers. Generally, software components include routines, programs, objects, components, data structures, etc. that perform particular tasks or implement particular abstract data types. Tasks might also be performed by remote processing devices that are linked through a communications network. In a distributed computing environment, software components may be located in both local and remote computer storage media.

The instructions and/or software components are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 8, the components of computer 802 may include, but are not limited to, a processing unit 804, a system memory 806, and a system bus 808 that couples various system components including the system memory to the processing unit 804. The system bus 808 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 802 typically includes a variety of computer-readable media. Computer-readable media can be any available media that can be accessed by computer 802 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital video discs (DVD) or other optical disk storage, magnetic cassettes, magnetic tape, magnetic disk storage or other magnetic storage devices, or any other medium which can be used to store the desired information and which can be accessed by computer 802. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 806 includes computer storage media in the form of volatile and/or nonvolatile memory such as read only memory (ROM) 810 and random access memory (RAM) 812. A basic input/output system 814 (BIOS), containing the basic routines that help to transfer information between elements within computer 802, such as during start-up, is typically stored in ROM 810. RAM 812 typically contains data and/or software components that are immediately accessible to and/or presently being operated on by processing unit 804. By way of example, and not limitation, FIG. 8 illustrates operating system 816, applications 818, software components 820, and program data 822.

The computer 802 may also include other removable/non-removable, volatile/nonvolatile computer storage media. By way of example only, FIG. 8 illustrates a hard disk drive 824 that reads from or writes to non-removable, nonvolatile magnetic media, a magnetic disk drive 826 that reads from or writes to a removable, nonvolatile magnetic disk 828, and an optical disk drive 830 that reads from or writes to a removable, nonvolatile optical disk 832 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 824 is typically connected to the system bus 808 through a non-removable memory interface such as data media interface 834, and magnetic disk drive 826 and optical disk drive 830 are typically connected to the system bus 808 by a removable memory interface.

The drives and their associated computer storage media discussed above and illustrated in FIG. 8 provide storage of computer-readable instructions, data structures, software components, and other data for computer 802. In FIG. 8, for example, hard disk drive 824 is illustrated as storing operating system 816', applications 818', software components 820', and program data 822'. Note that these components can either be the same as or different from operating system 816, applications 818, software components 820, and program data 822. Operating system 816', applications 818', software components 820', and program data 822 are given different numbers here to illustrate that, at a minimum, they are different copies. A user may enter commands and information into the computer 802 through input devices such as a keyboard 836, and pointing device (not shown), commonly referred to as a mouse, trackball, or touch pad. Other input devices may include source devices (such as a microphone 838 or camera 840 which provide streaming data), joystick, game pad, satellite dish, scanner, or the like. These and other input devices are often connected to the processing unit 802 through an input/output (I/O) interface 842 that is coupled to the system bus, but may be connected by other interface and bus structures, such as a parallel port, game port, or a universal serial bus (USB). A monitor 844 or other type of display device is also connected to the system bus 808 via an interface, such as a video adapter 846. In addition to the monitor 844, computers may also include other rendering devices (e.g., speakers) and one or more printers, which may be connected through the I/O interface 842.

The computer may operate in a networked environment using logical connections to one or more remote computers, such as a remote device 850. The remote device 850 may be the same as or different from the plurality of content servers 112 and EPG server 136 of FIG. 1. The remote device 850 may be a personal computer, a network-ready device, a server, a router, a network PC, a peer device or other common network node, and typically includes many or all of the elements described above relative to computer 802. The logical connections depicted in FIG. 8 include a local area network (LAN) 852 and a wide area network (WAN) 854. Although the WAN 854 shown in FIG. 8 is the Internet, the WAN 854 may also include other networks. Such networking environments are commonplace in offices, enterprise-wide computer networks, intranets, and the like.

When used in a LAN networking environment, the computer 802 is connected to the LAN 852 through a network interface or adapter 856. When used in a WAN networking environment, the computer 802 typically includes a modem 858 or other means for establishing communications over the Internet 854. The modem 858, which may be internal or external, may be connected to the system bus 808 via the I/O interface 842, or other appropriate mechanism. In a networked environment, program modules depicted relative to the computer 802, or portions thereof, may be stored in the remote device 850. By way of example, and not limitation, FIG. 8 illustrates remote software components 860 as residing on remote device 850. It will be appreciated that the network connections shown are exemplary and other means of establishing a communications link between the computers may be used.

Conclusion

Although the invention has been described in language specific to structural features and/or methodological acts, it is to be understood that the invention defined in the appended claims is not necessarily limited to the specific features or acts described. Rather, the specific features and act are disclosed as exemplary forms of implementing the claimed invention.

What is claimed is:

1. A method comprising:
    receiving, by a client device, electronic program guide (EPG) data from an EPG provider, the EPG data describing characteristics of media assets that are available from a content provider;
    identifying, by the client device, one or more locally available media assets, the locally available media assets including:
        a local media asset previously stored on the client device from a broadcast of a content provider over the network; and
        a local media asset that is available for output through execution of an application installed on the client device, the application being selected from a group of applications;
    generating, by a guide application on the client device, an EPG display based on the EPG data and the locally available media assets, the EPG display being configured to simultaneously display different types of media assets including the media assets that are available from the content provider and each of the local media assets as respective different types of media assets, each media asset being directly selectable through interaction with the EPG display;
    receiving a user-submitted selection of a particular media asset represented in the EPG display, the particular media asset being selected from those being simultaneously displayed;

in response to the user-submitted selection of the particular media asset being received through interaction with the EPG display:
the guide application passing the user-submitted selection to a virtual tuner executed on the client device; and
the virtual tuner executed on the client device selecting an application for presenting the particular media asset;
managing, by the virtual tuner, execution of the application for presenting the particular media asset, wherein the managing includes:
receiving an event that includes a universal content descriptor;
determining whether an application from the group of applications is currently providing a media asset for output; and
in an instance no application from the group of applications is currently providing a media asset for output:
identifying, based at least on the universal content descriptor, an application corresponding to the event from the group of applications:
launching the application corresponding to the event, the application being identified based at least on the universal content descriptor;
determining whether an action indicated by the event is to be performed by the application corresponding to the event;
in an instance the action indicated by the event is not to be performed by the application corresponding to the event, causing the client to perform the event; or
in an instance the action indicated by the event is to be performed by the application corresponding to the event, causing the application corresponding to the event to perform the action; or
in an instance an application from the group of applications is currently providing a media asset for output:
determining whether the event corresponds to the application currently providing the media asset for output;
in an instance the event does not correspond to the application currently providing the media asset for output:
terminating the application currently providing the media asset for output;
identifying, based at least on the universal content descriptor, an application corresponding to the event from the group of applications;
launching the application corresponding to the event;
determining whether an action indicated by the event is to be performed by the application corresponding to the event;
in an instance the action indicated by the event is not to be performed by the application corresponding to the event, causing the client to perform the event; or
in an instance the action indicated by the event is to be performed by the application corresponding to the event, causing the application corresponding to the event to perform the action; or
in an instance the event corresponds to the application currently providing the media asset for output:
determining whether an action indicated by the event is to be performed by the application corresponding to the event;
in an instance the action indicated by the event is not to be performed by the application corresponding to the event, causing the client to perform the event; or
in an instance the action indicated by the event is to be performed by the application corresponding to the event, causing the application corresponding to the event to perform the action.

2. One or more computer storage media excluding a signal without physical structure, the computer storage media comprising computer executable instructions that, when executed on a computer, configure the computer to perform the method of claim 1.

3. In a virtual tuner executed on a client, a method comprising:
receiving, by the virtual tuner, a selection made from a plurality of content using an EPG that is output by the client, wherein:
the EPG includes a representation of each said content for simultaneous display by the client;
each said content is provided for output by a respective one or more of a plurality of applications; and
at least one said content is television programming;
choosing, by the virtual tuner, one or more of the plurality of applications that, when executed, provide the selected content represented by the EPG, wherein the choosing is independent of any application identifying information originating from a computer distinct from the client; and
managing, by the virtual tuner without user intervention, a lifecycle of the chosen one or more applications including execution of the chosen one or more applications to output the selected content, wherein the managing includes:
receiving an event that includes a universal content descriptor;
determining whether an application from the group of applications is currently providing the selected content for output;
in a scenario when no application from the group of applications is currently providing the selected content for output:
identifying, based at least on the universal content descriptor, an application corresponding to the event from the group of applications;
launching the application corresponding to the event;
determining whether an action indicated by the event is to be performed by the application corresponding to the event;
in a scenario when the action indicated by the event is not to be performed by the application corresponding to the event, causing the client to perform the event; or
in a scenario when the action indicated by the event is to be performed by the application corresponding to the event, causing the application corresponding to the event to perform the action; or
in a scenario when an application from the group of applications is currently providing the selected content for output:
determining whether the event corresponds to the application currently providing the selected content for output;
in a scenario when the event does not correspond to the application currently providing the selected content for output:
terminating the application currently providing the selected content for output;

identifying, based at least on the universal content descriptor, an application corresponding to the event from the group of applications;
launching the application corresponding to the event;
determining whether an action indicated by the event is to be performed by the application corresponding to the event;
in a scenario when the action indicated by the event is not to be performed by the application corresponding to the event, causing the client to perform the event; or
in a scenario when the action indicated by the event is to be performed by the application corresponding to the event, causing the application corresponding to the event to perform the action; or
in a scenario when the event corresponds to the application currently providing the selected content for output:
determining whether an action indicated by the event is to be performed by the application corresponding to the event;
in a scenario when the action indicated by the event is not to be performed by the application corresponding to the event, causing the client to perform the event; or
in a scenario when the action indicated by the event is to be performed by the application corresponding to the event, causing the application corresponding to the event to perform the action.

4. The method as described in claim 3, wherein the managing is performed in response to one or more events received from the EPG.

5. The method as described in claim 3, wherein said content provided by a first said application is not compatible with a second said application.

6. The method as described in claim 3, wherein:
the managing includes managing one or more windows; and
at least one said window is utilized to display the selected content.

7. The method as described in claim 3, wherein the plurality of content includes remote content available over the Internet and local content available locally on the client.

8. One or more computer storage media excluding a signal without physical structure, the computer storage media comprising computer executable instructions recorded thereon that, when executed on a computer, configure the computer to perform the method of claim 3.

9. A client comprising:
a processor;
a network interface, communicatively coupled to the processor, configured to provide a network connection to a wide area network (WAN);
an output interface, communicatively coupled to the processor, the output interface configured to provide an output for rendering by a display device; and
a memory configured to maintain:
a plurality of applications that are executable on the processor to provide an output of content on the output interface, the content including remote content available over the WAN and local content available locally on the client and the local content being comprised of user created content;
an electronic program guide (EPG) engine that is executable on the processor to provide an EPG for output on the output interface, wherein the EPG simultaneously displays a plurality of representations of said content for selection; and
a virtual tuner that is executable on the processor to launch one or more of said plurality of applications in response to selection of said representations of said content, independent of any application identifying information originating from a computer distinct from the client, said virtual tuner utilizing an application identification table that includes a listing of one or more applications to enable execution of each of said plurality of applications, wherein the virtual tuner further is executable on the processor to cause the one or more of said plurality of applications to:
receive an event that includes a universal content descriptor;
determine whether an application from the plurality of applications is currently providing output of content;
in an event no application from the group of applications is currently providing output of content:
identify, based at least on the universal content descriptor, an application corresponding to the event from the group of applications;
launch the application corresponding to the event;
determine whether an action indicated by the event is to be performed by the application corresponding to the event;
in an event the action indicated by the event is not to be performed by the application corresponding to the event, cause the client to perform the event; or
in an event the action indicated by the event is to be performed by the application corresponding to the event, cause the application corresponding to the event to perform the action; or
in an event an application from the group of applications is currently providing output of content:
determine whether the event corresponds to the application currently providing the output of content;
in an event the event does not correspond to the application currently providing the output of content:
terminate the application currently providing the output of content;
identify, based at least on the universal content descriptor, an application corresponding to the event from the group of applications;
launch the application corresponding to the event;
determine whether an action indicated by the event is to be performed by the application corresponding to the event;
in an event the action indicated by the event is not to be performed by the application corresponding to the event, cause the client to perform the event; or
in an event the action indicated by the event is to be performed by the application corresponding to the event, cause the application corresponding to the event to perform the action; or
in an event the event corresponds to the application currently providing the output of content:
determine whether an action indicated by the event is to be performed by the application corresponding to the event;
in an event the action indicated by the event is not to be performed by the application corresponding to the event, cause the client to perform the event; or in an event the action indicated by the event is to be performed by the application corresponding to the event, cause the application corresponding to the event to perform the action.

10. The client as described in claim 9, wherein the virtual tuner is further executable to terminate execution of the one or more said applications.

11. The client as described in claim 9, wherein the virtual tuner is further executable to:
manage one or more windows corresponding to the plurality of applications; and
at least one said window includes a display of the selected said content.

12. The client as described in claim 9, wherein:
the network interface is configured as a tuner for receiving one or more broadcasts of television programming over the WAN; and
the WAN is configured as a broadcast network.

13. The client as described in claim 9, wherein the content provided by a first said application is not compatible with a second said application.

14. The client as described in claim 9, wherein the WAN includes the Internet.

15. A method as recited in claim 1, wherein the guide application, responsive to the particular media asset being selected, passes a selection to the virtual tuner, the selection including:
the user-submitted selection; and
an indication of how the particular media asset is encoded or encrypted.

16. A method as recited in claim 1, the locally available media assets further including a user created local media asset.

17. A method as recited in claim 1, wherein the managing includes:
launching the chosen one or more applications for outputting the selected said content; and
terminating the chosen one or more applications when the outputting is completed.

18. A method as recited in claim 1, wherein the managing includes:
launching the chosen one or more applications for outputting the selected said content; and
terminating the chosen one or more applications when an event is received from the EPG.

19. A method as recited in claim 1, wherein the managing includes:
while a first media asset is being output, receiving an event indicating a request to output a second media asset;
determining whether the application that is executing to output the first media asset is of the type to output the second media asset, wherein:
in an event that the application is of the type to output the second media asset, outputting the second media asset by the application; and
in an event that the application is not of the type to output the second media asset, terminating the application that is executing and launching a new application that corresponds to the second media asset.

20. One or more computer-readable media devices having computer executable instructions recorded thereon, the computer-executable instructions when executed on a computer, programming the computer to perform the method of claim 1.

21. An article of manufacture excluding a signal without physical structure, the article of manufacture having computer executable instructions recorded thereon, the computer-executable instructions when executed on a computer, programming the computer to perform the method of claim 1.

22. A method as described in claim 3, wherein the plurality of content from which the selection of each said content is made is being displayed simultaneously for selection.

23. A method as described in claim 3, wherein at least a second said content comprises user created content.

24. A method as recited in claim 3, wherein the managing includes:
launching the chosen one or more applications for outputting the selected said content; and
terminating the chosen one or more applications when the outputting is completed.

25. A method as recited in claim 3, wherein the managing includes:
launching the chosen one or more applications for outputting the selected said content; and
terminating the chosen one or more applications when an event is received from the EPG.

26. A method as described in claim 3, wherein managing the lifecycle includes the virtual tuner:
launching the chosen one or more applications;
terminating the chosen one or more applications; and
managing windows where the output of the selected content is rendered.

27. A method as recited in claim 3, wherein the managing includes:
while a first content is being output, receiving an event indicating a second content to be output;
determining whether the application that is executing to output the first content is of the type to output the second content, wherein:
in an event that the application is of the type to output the second content, outputting the second content by the application; and
in an event that the application is not of the type to output the second content, terminating the application that is executing and launching a new application that corresponds to the second content.

28. One or more computer-readable media devices having computer executable instructions recorded thereon, the computer-executable instructions when executed on a computer, programming the computer to perform the method of claim 3.

29. An article of manufacture excluding a signal without physical structure, the article of manufacture having computer executable instructions recorded thereon, the computer-executable instructions when executed on a computer, programming the computer to perform the method of claim 3.

30. A client as described in claim 9, wherein each of said plurality of said representations includes respective encoding or encrypting information corresponding to an entry in the application identification table.

31. A client as described in claim 9, wherein the virtual tuner further is executable on the processor to cause the one or more of said plurality of applications to:
provide the content being selected to the output interface; and
terminate the one or more of said plurality of applications when the outputting is completed.

32. A client as described in claim 9, wherein the virtual tuner further is executable on the processor to cause the one or more of said plurality of applications to:
provide the content being selected to the output interface; and
terminate the one or more of said plurality of applications when an event is received from the EPG.

33. A client as described in claim 9, wherein the virtual tuner further is executable on the processor to cause the one or more of said plurality of applications to:
- provide the content being selected to the output interface;
- terminate the one or more of said plurality of applications; and
- manage windows where the output of the content being selected is rendered by the display device.

34. A client as described in claim 9, wherein the virtual tuner further is executable on the processor to cause the one or more of said plurality of applications to:
- while output of a first content is being rendered by the display device, receive an event indicating a second content for output;
- determine whether an application that is executing to output the first content is of the type to output the second content, wherein:
  - in an event that the application that is executing is of the type to output the second content, cause the application that is executing to output the second content; and
  - in an event that the application that is executing is not of the type to output the second content, terminate the application that is executing and launch another application from the one or more of said plurality of applications that corresponds to the second content.

* * * * *